Aug. 29, 1944. G. V. ELTGROTH 2,356,922
DIRECTION FINDING APPARATUS
Filed April 27, 1942 2 Sheets-Sheet 1

INVENTOR
GEORGE V. ELTGROTH
BY Joseph Q. Stansfield
ATTORNEY

Aug. 29, 1944.  G. V. ELTGROTH  2,356,922
DIRECTION FINDING APPARATUS
Filed April 27, 1942  2 Sheets-Sheet 2

INVENTOR.
George V. Eltgroth
BY
David F. Doody
ATTORNEY

Patented Aug. 29, 1944

2,356,922

UNITED STATES PATENT OFFICE 2,356,922

DIRECTION FINDING APPARATUS

George V. Eltgroth, Towson, Md., assignor to Bendix Aviation Corporation, South Bend, Ind., a corporation of Delaware Application April 27, 1942, Serial No. 440,571

8 Claims. (Cl. 250—11)

This invention relates to radio direction finders employing grid controlled gas discharge tubes in a phase responsive circuit, and more particularly to a phase responsive control circuit having improved sensitivity for low input voltages.

In the field of radio aids to navigation, the self-orienting or automatic radio direction finder occupies an important position. In one of the present forms in which it is manufactured there is employed a rotatably mounted loop antenna whose signal output passes through a balanced modulator excited by a switching oscillator, the modulator output is then combined with the signal derived from a non-directional antenna, passed through a superheterodyne signal amplifier, demodulated, and the demodulator output fed to the grid circuits of a pair of grid controlled gas discharge tubes whose anodes receive alternating current energy at the frequency of said switching oscillator through two current controlled relay devices, such as electromagnetic relays or saturable reactors, these relay devices controlling an electric motor connected in driving relationship to said rotatable loop antenna. As is well known in the art, a radio direction finder of the type outlined above provides at the output of the demodulator an alternating voltage at the frequency of the switching oscillator whose phase with respect to the voltage impressed on the anodes of the gas discharge tubes reverses as the loop antenna is rotated through the null or position of zero signal pickup. A discharge is established in the tube in which the positive grid excursion and the positive anode excursion occur at the same time, and the corresponding relay device is thereupon actuated. The relay devices are connected to cause the motor to rotate the loop in the direction of a selected one of the two nulls, and when the loop has reached this null no signal is impressed on the modulator, whereupon the output voltage of the demodulator vanishes and both relay devices are deactuated, the loop then remaining stationary with its plane parallel to the plane of the incident wave front. The station bearing is now determined by reading a bearing indicating device operatively connected to said loop antenna.

The figure of eight polar pattern of loop pickup sensitivity of the loop shows that the output voltage decreases rapidly in the region of the null, and the demodulator output therefore varies with the magnitude of the loop displacement from the bearing of the station. It is desired that the means of controlling the loop driving motor be as sensitive as possible to small deviations of the loop from the desired bearing, in order that variations in the drag on the loop driving system, such as might be caused by the congealing of the bearing lubricant at temperatures of 40 degrees below zero or more, and by icing of the loop structure will not cause errors in the indicated bearing. To this end, it is required that the gas discharge tubes conduct during the largest possible portion of the positive half cycle of the anode voltage, and this is obviously achieved when conduction starts at the beginning of this positive half cycle. When input voltages to the grids of the gas discharge tubes are low, it is necessary that the grid voltage lead very nearly 90 degrees on the anode voltage wave for conduction to start early in the cycle, but with this phase relationship set up, it is found that when the input voltage becomes large that not one, but both tubes fire, with great resultant loss in the driving torque applied to the loop. Because of this, present design practice is to keep the input voltage to the control grids of the gas discharge tubes either almost exactly in or almost exactly out of phase with the anode voltage wave.

It is a principal object of this invention to provide self-orienting radio direction finding apparatus with improved bearing accuracy in the presence of high friction loads impressed on the rotating directional antenna and during aircraft maneuvers.

A further object of the invention is to provide self-orienting radio direction finding apparatus in which the driving torque applied to the rotating directional antenna rises to its maximum value for very small displacements of the antenna from the correct bearing.

Still another object of the invention is to provide improved sensitivity of phase responsive circuits to small applied voltages without at the same time impairing the operation of the circuit at high input signal levels.

The above objects and advantages of the invention are accomplished by connecting the demodulator output to the input terminals of the phase responsive circuit through a vacuum tube amplifier and a transformer which is tuned to the frequency of the alternating current output of the demodulator, this transformer being so designed that the effective inductance increases as the applied voltage or current increases within the working range of the apparatus. As a result of the increase in transformer winding inductance the phase of the transformer output voltage relative to the voltage applied to the vacuum tube amplifier advances as the input voltage decreases. In this manner the small signal response of the gas discharge tubes is improved without causing both tubes to fire in the presence of a large signal.

Other objects and advantages will in part be disclosed and in part be obvious when the following specification is read in conjunction with the drawings in which.

It is to be understood that these drawings are intended to illustrate one of the many forms in which the invention may be utilized and are not to comprise a limitation in the content or scope of the invention.

Figure 1:
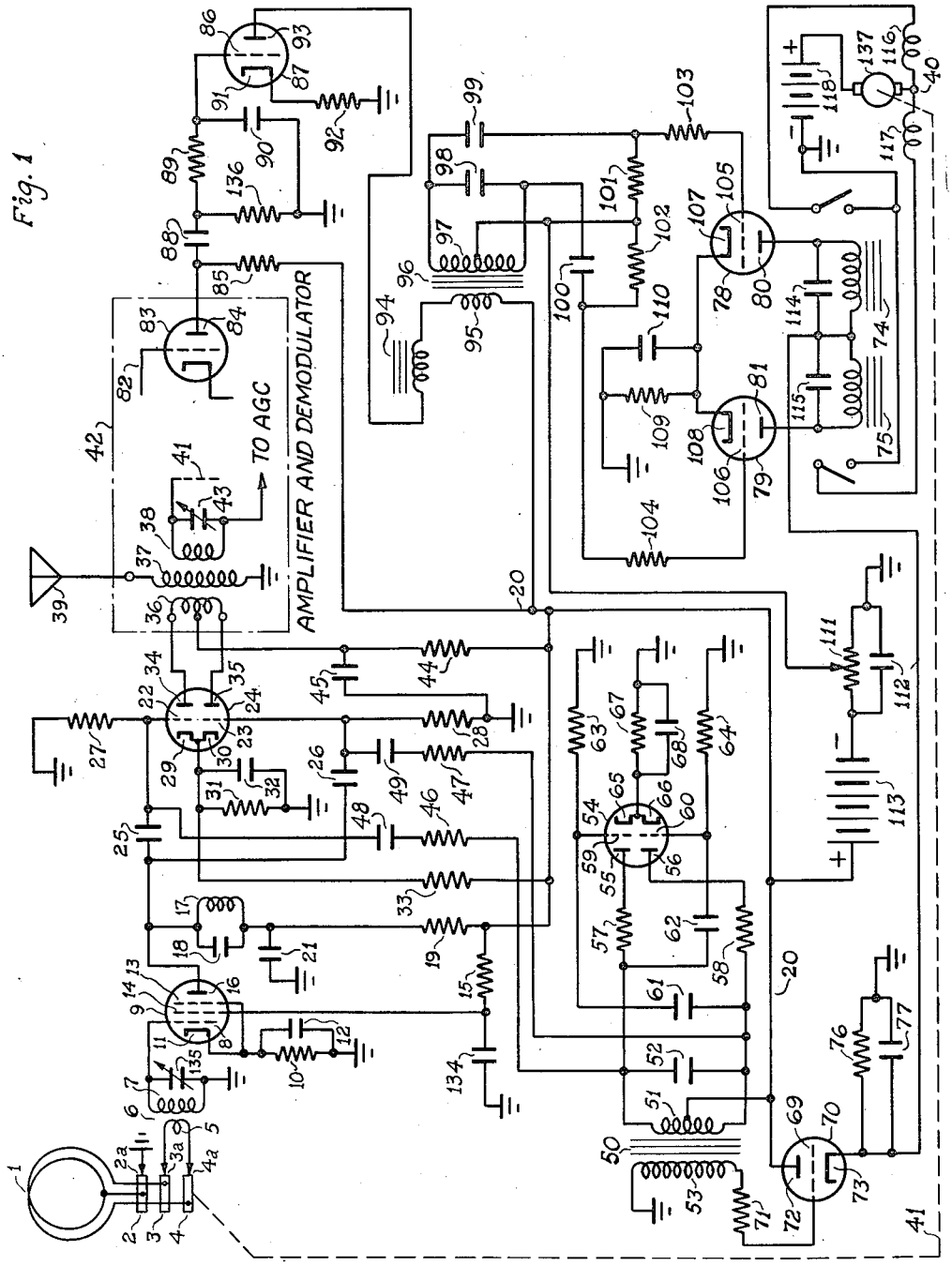
Figure 1 is a schematic diagram of the invention as employed in a self-orienting radio direction finder.

Referring to Figure 1, there is shown a schematic diagram of a self-orienting radio compass incorporating my invention. An electro-statically shielded center tapped loop antenna 1 serves as the directional antenna, this antenna being rotatably mounted and driven by the motor 40 through the driving connection 41. Connections to the loop 1 are established through the slip rings 2, 3 and 4 in cooperation with the brushes 2a, 3a and 4a respectively, the outside terminals of the loop winding being thereby connected to the primary 5 of input transformer 6 while the loop center tap is grounded by brush 2a. The secondary winding 7 of transformer 6, tuned by the condenser 135, is connected to the control grid 8 of the vacuum tube 9, which may be of the type known commercially as the 6K7. Grid bias for this tube is provided by the resistor 10 connected between the cathode 11 and ground, the condenser 12 serving to prevent loss of gain at this point. The suppressor 13 of tube 9 is connected to the cathode 11, and the screen grid 14 is maintained at a positive potential with respect to cathode 11 by energy supplied from the high voltage bus 20 through the dropping resistor 15, while the condenser 134 maintains grid 14 essentially grounded for radio frequency potentials. The anode 16 is also connected to the high voltage bus 20 through the load circuit comprising inductance 17 and tuning capacitance 18, the resistor 19 and the capacitor 21 serving as an isolation filter. Inductance 17 and capacitor 18 are selected to resonate at a frequency lower than the lowest frequency at which it is intended to operate, and this circuit consequently appears as a capacitance at all operating frequencies. The signal potentials appearing at the anode 16 are impressed on the control grids 22, 23 of modulator tube 24, which may be of the type commercially designated as 6SC7, via the coupling condensers 25, 26, which may be of the order of 100 micromicrofarads, and a direct current path from the control grids to ground is established through resistors 27, 28, which may have a value of 250,000 ohms. The cathodes 29, 30 are connected together within the tube 24 and grounded through the resistor 31 paralleled by the condenser 32, and the current flowing into the combination through the resistor 33 from the high voltage bus 20 assists in securing a stable grid bias voltage of the desired magnitude.

The anodes 34, 35 of the modulator are connected to the end terminals of the center-tapped primary winding 36 of the mixing transformer, this winding being coupled to the secondary winding 38 as is also the antenna winding 37, one end of which is connected to the substantially non-directional antenna 39, while the other is grounded. The secondary winding 38 is tuned to the frequency of the desired signal by the tuning capacitor 43, and the developed voltage is applied to the control grid 41 of the input tube of the amplifier and demodulator 42. In a preferred form of the invention, the amplifier may be of the superheterodyne type with its attendant advantages. In practice, the tuning condensers 135 and 43 are ganged together with any other tuning capacitors in the amplifier and demodulator 42 to provide single control tuning. Anode voltage for the modulator stage is supplied through the resistance-capacity filter 44, 45 to the center-tap of winding 36.

In addition to the radio frequency signal voltage on grids 22, 23, there is also present a low frequency switching voltage derived from the switching oscillation transformer 50 through the resistors 46, 47 which may be of 250,000 ohms and the combination phase shifting and blocking capacitors 48, 49 which may have a value of 0.002 mfd. The transformer 50 is provided with a center tapped primary winding 51 and a secondary winding 53, the ratio of secondary to primary turns being in one particular structure 6 to 1. The condenser 52 across the primary winding is selected to provide an oscillation frequency of the desired value. The anodes 55, 56 of the switching oscillator tube 54, which may be of the type known commercially as type 6N7, are connected to the ends of primary winding 51 through resistors 57, 58 respectively, which serve to improve the output waveform. Oscillation feed back voltage is impressed on the control grids 59, 60 by the coupling condensers 61, 62, and the grid return is established by the resistors 63, 64. The cathodes 65, 66 are connected together within the tube 54 and returned to ground through the resistor 67 paralleled by the bypass capacitor 68. The operation of the switching oscillator just described takes place in a manner well known to those skilled in the art, and for that reason will not be dwelt upon in detail. The voltage developed across the secondary winding 53 is in phase with that appearing across the primary winding 51, and is impressed on the control grid 69 of the cathode follower tube 70 which may be of the type commercially designated as 6F6, triode connected, through the grid current limiting resistor 71. The anode 72 of the tube 70 is connected to the high voltage bus 20, and the cathode 73 is connected to the junction of the windings of the control relays 74, 75, the resistor 76 being connected from this point to ground to insure stability of operation while the condenser 77 is provided to eliminate the radio frequency interference caused by the operation of the gas discharge tubes 78, 79. As is obvious, this arrangement provides positive impulses at the frequency of the switching oscillator to the anodes 80, 81 of the gas discharge tubes. These gas discharge tubes are frequently referred to in the art as thyratrons, and may be of the commercial type 2051, with the shield grid connected to the cathode.

The signal appearing on the grid 41 is amplified and demodulated within the amplifier and demodulator 42, and the output of the demodulator is impressed on the control grid 82 of the audio amplifier tube 83, which may be the type commercially designated as 6J5, whose anode 84 is connected to the high voltage bus 20 through the load resistor 85 and the voltage developed across this resistor is impressed on the control grid 86 of the compass amplifier tube 87, which may be of the type commercially designated 6J5, through the coupling capacitor 88 and the resistance-capacity filter 89, 90 which assists in removing the high frequency modulation components introduced on the received signal at the transmitting station. The direct current grid return path is established through the resistor 136. In a particular model of the apparatus resistor 89 had a value of 500,000 ohms and the filter capacitor 90 was 0.004 mfd. The cathode 91 of the compass amplifier tube 87 is returned to ground through the unbypassed resistor 92 to provide the necessary control grid bias voltage, and the anode 93 is maintained at a positive potential by connection to the high voltage bus 20 through the reactor 94 and the primary winding 95 of the filter transformer 96 having the center-tapped secondary winding 97 which is tuned by the capacitor 98 to the frequency supplied by the switching oscillator. The reactor 94 and the tuned transformer 96 cooperate as a filter to pass only the frequency impressed on the received radio frequency energy by the switching oscillator and the modulator, and condensers 99, 100 and the resistors 101, and 102 serve to provide proper termination for this filter. The values of the last mentioned condensers and resistors will vary with the design of the transformer 96, and with the design described herein capacitors of 0.025 mfd. have proved satisfactory for capacitors 98, 99, 100 and resistors of 100,000 ohms were employed for resistors 101 and 102. The operating characteristics of the transformer 96 confer upon this arrangement the unusual improvements in operation which have been obtained and will therefore be the subject of a later discussion.

The voltage appearing across the resistors 101 and 102 is impressed on the control grids 105, 106 of the two gas discharge tubes 78, 79 in series with the protective resistors 103 and 104, and the cathodes 107, 108 are connected together and the junction point in turn connected to ground through the resistor 109, which may have a value of 1500 ohms, paralleled by the capacitor 110, for which a value of 50 microfarads has been found satisfactory. Initial grid bias for the two gas discharge tubes is obtained from the potentiometer 111 shunted by the bypass capacitor 112, one terminal of the potentiometer being grounded and the other connected to the negative terminal of the anode supply source 113, which may have a potential of 250 volts D. C. The positive terminal of the source 113 is connected to the high voltage bus 20.

Returning now to the control relays 74, 75 whose windings are situated in the anode circuit of the gas discharge tubes, it will be noted that the windings are shunted by the condensers 114, 115 to increase the operating current available. A value of 0.5 mfd. is suitable for these capacitors when a switching oscillator frequency of approximately 50 cycles is used. The relay contacts are connected to the forward field winding 116 and and to the reverse field winding 117 respectively of the loop drive motor 40, having the armature 137. The motor is energized from the source 118 when one of the relays is in the operated position, and the direction of rotation is dependent upon the field winding which is energized, in this manner the loop antenna 1 may be rotated in one direction or the other as relay 74 or relay 75 is actuated.

The operation of the loop amplifier, modulator stage, switching oscillator and mixing transformer is well known in the art and will not be explained in detail here. Suffice it to say that there is impressed on the control grid 41 a radio frequency signal modulated at the frequency of the switching oscillations, and that the phase of the modulation envelope reverses with respect to the switching oscillation voltage on the control grid 22 as the point from which the signal is being received lies on one side of the polar null of the loop or the other. When the point of transmission lies on a line passing through the loop null, no voltage is induced in the loop and the percentage of modulation falls to zero. For reasons to be explained later, the resistor and condenser networks in the grid circuits of the modulator for reducing the amplitude of the switching oscillations to the desired value, are so proportioned that the voltage impressed on the control grids leads the alternating voltage at the switching oscillation transformer, in this particular example about 72 degrees, as the frequency of the switching oscillator is about 48 cycles per second. The demodulator output applied to the control grid 82 is, of course, in phase with the modulation envelope and consequently in phase with the voltage applied to the grids of the modulator stage. Through the action of the resistance-capacity filter 89, 90, the voltage on the control grid 86 is retarded approximately 32 degrees in phase for the particular circuit values employed, and the voltage on this grid therefore leads the voltage at the switching oscillation transformer by 40 degrees.

A resistance-capacity network for the attenuation of high frequencies always introduces a phase lag between output and input voltage, and it is in order to accommodate this characteristic of this simple low-price filter that such a large amount of lead is introduced in the modulating voltage at the modulator control grids.

In manufacture, the air gap in the core of the transformer 96 is adjusted so that the output voltage from the control grid 105 to ground is in phase with the control grid voltage at 86 for very low signal amplitudes, and the thyratron grid voltage at this point therefore leads the applied plate voltage derived from the cathode follower stage by 40 degrees. Under these conditions, when the loop antenna 1 is displaced from the null in one direction thyratron 78 is actuated, while the opposite displacement actuates thyratron 79. In either case, the associated relay is operated and the motor 40 operates to drive the loop toward the desired null, and when this point is reached, the 48 cycle modulation of the carrier disappears, and no signal voltage is applied to the gas discharge tube control grids, at which time they are rendered inoperative due to the residual bias supplied from the potentiometer 111.

The demodulator output at the switching oscillation frequency of 48 cycles per second varies with the displacement of the loop antenna 1 from the desired null, thus for a small displacement only a small control voltage is impressed on the control grid 86, and this voltage becomes larger as the displacement increases. The transformer 96 is so constructed that it operates on that part of the magnetization curve where increase in the applied voltage results in an increase in the effective inductance, and therefore, with a 5-volt signal applied to the control grid 86, the voltage applied to the control grid 105 is no longer in phase with the voltage impressed on the control grid 86, but lags this voltage by approximately 35 degrees. As will be explained in detail, this provides increased sensitivity to small deviations of the loop antenna from the desired position without impairing operation when the displacement is large.

In a particular transformer 96 used in making tests the usual EI shaped core laminations having a dimension assembled of 1¾ inches by 2 1/16 inches were employed. They were of Audio Grade A and 0.014 inch in thickness. Complete data on their magnetic properties may be found under EI–68 in Technical Bulletin EM-3 copyrighted in 1937 by the Allegheny Ludlum Steel Corporation. 63 laminations in all were used. The winding itself consisted of a 2100 turn primary 95 of number 39 enameled wire and a 10,500 turn secondary 97 of number 42 enameled wire. The primary inductance measured at 10 volts, 48 cycles per second with 0.010 ampere D. C. flowing was 17.6 henries. The inductance 94 used in conjunction with the above described transformer had an inductance of 44 henries measured under the same conditions.

Figure 2:
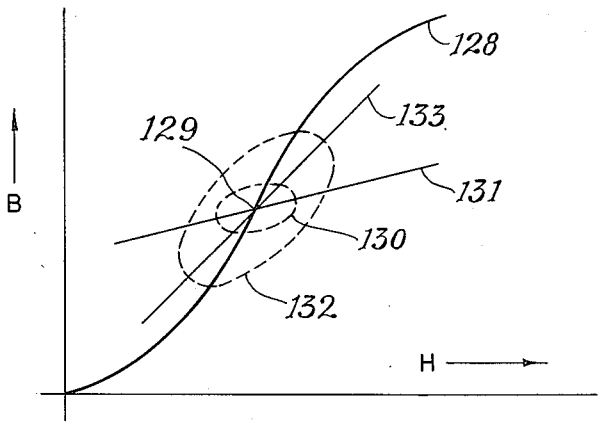
Figure 2 is a graph of the magnetization curve of the transformer magnetic circuit showing, superimposed thereon, operating ellipses of the transformer.

The operation of the transformer 96 may be more easily understood by reference to Figure 2, which is a magnetization curve for this particular structure. The operating point on curve 128 is indicated at 129. In the presence of a small alternating current flux, the path of operation followed by the iron is the small ellipse 130 having the major axis 131 extended; while in the presence of a large alternating current flux the path of operation is indicated by the large ellipse 132 having the major axis 133 extended. It will be noted that the two major axes have different slopes, and that the slope of the axis of the larger ellipse is the greater. It is well known that the effective inductance of a reactor is dependent on the slope of the major axis of these ellipses, and therefore the inductance to large signals is greater than the inductance presented to small signals. Thus, if a parallel resonant circuit having an inductance of this type be adjusted for zero phase shift for small applied potentials, the voltage across that circuit will lag the applied current in the presence of large currents. Transformer 96 and the associated circuit components are designed to make use of this phenomenon in increasing the gas discharge tube anode currents in the presence of small signals without at the same time causing the firing of both tubes in the presence of large signals.

Figure 3:
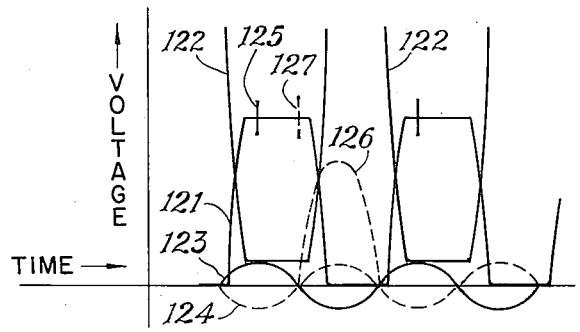
Figure 3 is a graph showing the wave form of the voltages at selected portions of the circuit of Figure 1 in the presence of small actuating potentials.

Referring now to Figure 3, 121 is the curve representing the effective internal voltage of the source of anode voltage for the gas discharge tubes. This is the curve which is shown on the screen of an oscillograph connected to the anode of either gas discharge tube with no control voltage applied to the control grids thereof. The curve 122 indicates the critical control grid voltage required to initiate the discharge in the gas tubes, voltages above this line permit firing of the tube, while a voltage below this line does not permit the flow of anode current. The solid curve 123 indicates the control grid voltage applied to the thyratron 78 which just causes firing of this tube, and curve 124 indicates the control grid voltage applied to the thyratron 79 under these conditions. The point on the anode voltage cycle at which conduction begins in thyratron 78 is indicated at 125, which it will be observed, lies to the left of the center of symmetry of the anode voltage cycle. Curve 126 indicates the voltage applied to the control grid of thyratron 79 when the input voltage amplitude is five times that of curve 124 and the phase relation between control grid voltage and anode voltage remains unchanged, 127 indicating the point on the anode voltage cycle at which conduction begins in thyration 79 under these conditions. The particular shape of curve 121 results from the fact that the voltage impressed on control grid 69 of the cathode follower tube 70 is sufficient to drive the control grid well beyond the cut-off point of plate current in the negative direction and also well above zero bias in the positive direction. The presence of the current limiting resistor 71 prevents the control grid 69 itself from assuming a potential which is very much positive with respect to the cathode 73 and therefore gives rise to the flat top on the anode voltage cycle in the positive direction. Approximately 45 electrical degrees are required for the transition of the anode voltage from minimum to maximum value.

In phase responsive control circuits designed up to the present time, it has been the practice to make the center of symmetry of the anode voltage wave and that of the control grid voltage wave co-incident or to cause the control grid voltage wave to lead only a few degrees with respect to the anode voltage wave. Under these conditions, it is evident that anode conduction will be initiated substantially at the mid-point of the anode voltage wave at the threshold of operation, and that the anode current will therefore have approximately half the value possible if conduction began at the very beginning of the anode voltage wave. It is desired that the point of pick-up as it is called, be moved as far forward on the positive anode voltage wave as possible, to secure the largest possible anode current at the threshold. This diagram shows the grid voltage leading approximately 40 degrees on the anode voltage wave, and the curve 123 is that control grid voltage required for threshold operation, with the anode pickup point indicated at 125. With these same phase relations maintained and the input voltage increased by a factor of 5, it will be noted that the voltage wave 126 now impressed on the control grid of the opposing thyration 79 now intersects the critical control grid voltage curve 122, causing pick-up of the anode current in this thyratron at 127, so that both thyratrons now conduct and operate their respective relays, causing the motor to become inoperative. For this reason, the use of such large angles of lead, with the accruing advantages, has never been possible in the past, as large signal voltages rendered the apparatus inoperative.

Figure 4:
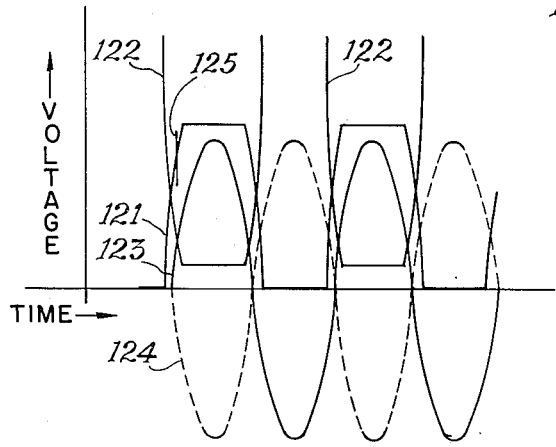
Figure 4 is a graph showing the wave form of the voltages at selected portions of the circuit of Figure 1 in the presence of large actuating potentials.

There are shown in Figure 4, curves of the various voltages existing when the signal amplitude is large and the system of my invention utilizing transformer 96 is employed. The voltage indicated by curve 123 is now seven times the voltage shown in Figure 3 and the curve leads the anode voltage wave by only five degrees due to the 35 degree lag introduced by the operating characteristic of the transformer 96. It is seen that the pickup point 125 is now advanced on the anode voltage wave as expected, showing that anode current in the thyratron 78 now begins earlier in the cycle, but that the control grid voltage 124 on thyratron 79 now does not intersect the critical control grid voltage curve 122, so that this latter tube remains inoperative. By the introduction of the transformer 96, therefore, with its special operating characteristics, desirable increase in sensitivity to small signals has been obtained without at the same time rendering the apparatus inoperative in the presence of large signal voltages.

In the drawings, the heaters and heater circuits associated with the various emissive cathodes have been omitted for the sake of simplicity. It will be obvious that many changes and modifications may be made in the invention without departing from the spirit thereof as expressed in the foregoing description and in the appended claims.

What I claim is:

1. In a radio direction finder including a directional antenna, a non-directional antenna, a switching oscillator, a modulator and a demodulator, said radio direction finder providing at the output of the demodulator an alternating voltage at the frequency of the switching oscillations which reverses in phase with respect to the switching oscillator output voltage as the directional antenna is rotated through the position of zero signal pickup; a plurality of grid controlled gas discharge tubes having a cathode, a control grid and an anode, a current responsive control device connected into each of the anode circuits of said tubes, means for supplying energy at the frequency of said switching oscillator output to the anode circuits of said tubes, and coupling means connected in energy transfer relation between said demodulator and said control grids of said gas discharge tubes, said coupling means introducing a change of phase angle in said transferred energy which is a function of the voltage amplitude applied to said coupling means.

2. In a radio direction finder including a rotatably mounted directional antenna, a non-directional antenna, a switching oscillator, a modulator and a demodulator, said radio direction finder providing at the output of said demodulator an alternating voltage at the frequency of the switching oscillator which reverses in phase with respect to the switching oscillator output voltage as said directional antenna is rotated through the position of zero signal pickup; a plurality of grid controlled gas discharge tubes having a cathode, a control grid and an anode, a current responsive control device connected into each of the anode circuits of said tubes, motor means coupled in driving relationship to said directional antenna, a source of energy for said motor means, means connecting said source and said motor means with said control devices, means for supplying energy at the frequency of said switching oscillator output to said anode circuits of said tubes, and coupling means connected in energy transfer relationship between said output of said demodulator and said control grids of said gas discharge tubes, said coupling means introducing a change of phase angle in said transferred energy which is a function of the voltage amplitude applied to said coupling means.

3. In radio direction finding apparatus including a switching oscillator generating energy at a switching oscillation frequency, means for modulating the signal output of a directional antenna, means for combining said modulated output with signal derived from a substantially non-directional antenna, and means for demodulating the combined signal; means for impressing voltage derived from said switching oscillator on said modulator in advanced phase with respect to the switching oscillator output voltage, circuit means having input and output terminals and providing at the output terminals thereof a voltage wave lagging in phase on the input voltage wave at said switching oscillation frequency, means connecting said input terminals to the output of said demodulating means, and coupling means connected in energy transfer relation between said output terminals and phase responsive means, said coupling means introducing a change of phase angle in said transferred energy which is a function of the voltage amplitude applied to said coupling means at said switching oscillation frequency.

4. In a phase responsive control circuit, a source of alternating current having variable amplitude and variable phase, a phase responsive device, and coupling means connected in energy transfer relation between said source and said device, said coupling means introducing a change of phase angle in said transferred energy which is a function of the voltage amplitude of said source.

5. In a phase responsive control circuit, a source of alternating current having variable amplitude and variable phase, a phase responsive device, and coupling means connected in energy transfer relation between said source and said device, said coupling means introducing a lag of phase angle in said transferred energy which is a function of the voltage amplitude of said source, said lag increasing as said voltage amplitude increases.

6. In combination with phase responsive means having input terminals, a source of alternating current having variable amplitude and variable phase, a vacuum tube amplifier having input and output circuits, means connecting said input circuit of said amplifier to said source, a transformer having primary and secondary windings designed to exhibit an increase in inductance with increase in applied voltage in the operating range of voltage and frequency, means connecting said primary winding in said output circuit of said amplifier, a capacitor connected across the terminals of said secondary winding, the magnitude of said capacitor being selected to provide a predetermined value of phase shift between the voltage applied to said input circuit of said amplifier and the voltage across said terminals of said secondary winding at a predetermined value of said input voltage, and means connecting the terminals of said secondary winding to said input terminals of said phase responsive means.

7. In phase responsive control apparatus, a source of alternating current energy, a plurality of grid controlled gas discharge tubes having a cathode, a control grid and an anode, a current responsive control device connected into each of the anode circuits of said tubes, means for supplying alternating current energy at the frequency of said source to said anodes of said discharge tubes in series with said current responsive devices, means for modifying the phase and amplitude of energy derived from said source in response to variations in a quantity under measurement, and coupling means connected in energy transfer relation between the output terminals of said modifying means and the control grids of said discharge tubes, said coupling means introducing a change of phase angle in said transferred energy which is a function of the voltage impressed on said coupling means by said modifying means.

8. In radio direction finding apparatus having means for modulating the signal output of a directional antenna, means for combining said modulated output with signal derived from a substantially non-directional antenna, and means for demodulating the combined signal; phase responsive means, and voltage responsive variable phase angle coupling means connected in energy transfer relationship between said demodulating means and said phase responsive means.

GEORGE V. ELTGROTH.